Patented Apr. 23, 1940

2,198,221

UNITED STATES PATENT OFFICE 2,198,221

LIQUOR PREPARATION

Sidney Musher, New York, N. Y., assignor to Musher Foundation Incorporated, New York, N. Y., a corporation of New York No Drawing. Application October 7, 1939, Serial No. 298,429

6 Claims. (Cl. 99—48)

This invention relates to the preparation of novel whiskeys and other alcoholic beverages having unusual desirable characteristics and also relates to the treatment of grains in novel manners in the manufacture of such whiskeys and alcoholic beverages.

In the processing of grains used in the manufacture of whiskey such as in the processing of corn for manufacture into bourbon whiskey; rye, for manufacture into rye whiskey; and barley for manufacture into Scotch whiskey, the grain, such as the corn, rye, or sprouted barley, is permitted to ferment by an yeast fermentation and the mash resulting is distilled in the production of the whiskey.

The residue obtained following the distillation process and containing converted and fermented decomposition products of the grain such as decomposition products of the sugars, alcohols and proteins is generally disposed of as sewage or, where disposal as sewage is not permitted, the residue is concentrated and sold at a low cost as animal feed. This residue is normally high in decomposed proteins and fermented sugars and contains fibers and oil as present in the original grain before fermentation.

In accordance with the present invention, a steep-water containing the water soluble constituents, extracted preferably by a slightly acidified water, of the grain and substantially free of solubilized, converted or fermented carbohydrate or protein material is separated from the grain, concentrated under reduced pressure and added back to the whiskey following distillation, whereby there is prepared a whiskey having highly desirable flavor and food characteristics. In other words, there are reincorporated in the whiskey the water soluble constituents removed from the grain and which constituents would be materially changed in composition and characteristics if permitted to remain in the grain during the fermentation procedures.

For example, in the manufacture of corn whiskey, whole maize or corn, either yellow or white and which may where desired be degerminated, is desirably ground to a 20 to 30 mesh.

The raw and unbleached, dry milled, finely divided corn should be mixed or agitated thoroughly with a quantity of water, preferably acidified, for a period of about 1 hour at a temperature of 135° F. The time of agitation may vary from 5 minutes to 2 hours or more dependent upon the fine state of division of the corn, but in order to obtain the maximum yield and the most desirable product, the time period for continuous agitation should be between about 45 minutes and 1 hour.

The temperature of the water at the time of the extraction should not be in excess of about 140° F. to 145° F. in order to avoid solubilization and gelatinization of the starch, protein decomposition and other forms of conversion, which are highly undesirable in the production of the desired steep-water.

The water temperature should also not be less than about 125° F. to 130° F. in order to obtain the maximum yield of the desired water soluble substances. A difference of as little as 10° F. in the temperature of the water used for extraction may account for a 50% to 75% loss in the yield of the solids in the steep-water that is obtained and therefore the most suitable temperature of the water for extraction is about 135° F.

The water used should be substantially free of minerals and desirably free of iron and copper. Preferably, in order to obtain a clear supernatant water containing the extract, the pH of the water should be adjusted to between 4.5 and 6.9 and preferably to 5.5 to 6 by addition of a mineral acid such as hydrochloric, sulphuric or phosphoric, or an organic acid such as acetic, tartaric, citric, etc., or by the addition of acid salts such as acid sulphates or phosphates. This adjustment may take place during or before the extraction.

The corn may be agitated in the water at 135° F. for the 1 hour period. The pH adjustment will also serve to increase the rate at which insoluble material will settle out leaving a clear supernatant water portion containing the extract.

Any quantity of water may be used to produce a free flowing mixture. One part of corn should preferably be mixed with about 5 parts of water by weight. Other proportions may also be used such as from 4 to 15 parts of water to every 1 part of corn.

Another very satisfactory method is for the corn to be ground or milled with sufficient water to produce a paste and whereby the cell structure of the corn is so broken into as to permit the maximum solubility of the water extractable substances into the water. Then the pulpy aqueous mass may be pressed or centrifuged or otherwise treated to remove the aqueous solution containing the extractable substances. Preferably the same temperature and acidity are employed as above. The solution may be clarified of filtered or where additional water is added, allowed to settle out.

Where the corn-water suspension is allowed to stand for settling out, and after the 1 hour agitation and extraction period, the solution should desirably be cooled by placing it in a jacketed or coiled vat or by running water through cooling coils immersed or by adding cold water to the hot corn-water suspension, so that the temperature of the water is reduced from 135° F. to from 80° F. to 105° F. and preferably to about 100° F. in order to avoid fermentation during the settling period. The solution thus cooled may then be treated to remove the undissolved starch, fibrous and other corn insoluble portions. This may be accomplished by allowing the solution to settle for from 2 to 12 hours until a substantially clear unfermented supernatant liquid is formed which liquid is removed by decanting, siphoning or filtering.

The solution containing the corn may also be subjected to a continuous centrifuging whereby all undissolved material is removed as a continuous operation.

The substantially clear steep-water thus obtained should desirably be evaporated by vacuum distillation at 135° F. under 25 inches of vacuum, to approximately 25% to 75% solids and desirably to about 65% to 70% solids and to a Baumé of about 37°. After the proper solids content has been reached, the steep-water should desirably be subjected to superheated steam in the vacuum pan in order to raise the temperature of the concentrated steep-water to about 190° F. to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated steep-water may where desired be packed in cans or other containers and sterilized at 220° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will help to avoid such precipitation and coagulation.

The slightly acidified concentrated steep-water of raw unbleached dry milled corn thus obtained will be of yellow to dark brown or tan color and will be high in water soluble carbohydrate sugar material and will also contain organic phosphorous and organic nitrogen compounds which appear to be very essential in obtaining the desired action when added to whiskey.

There is a difference between the concentrated steep-water obtained from corn and that obtained from other grains such as rye, or barley insofar as appearance and general characteristics are concerned, although they are all desirable for use in accordance with this invention and are all substantially starch, fiber and oil free and contain water soluble carbohydrates.

It is not desirable to concentrate the steep-water down to in excess of about 70% solids in the vacuum pan, as otherwise darkening and caramelization of the steep-water occur.

Where drying is desirable, the concentrated steep-water may be dried on trays, preferably under vacuum and a desirable dried product will be obtained. Drum drying is difficult in view of the mucilaginous nature of the steep-water by means of which the steep-water solids adhere to the drum and cannot readily be scraped off. Spray drying may less preferably be resorted to in view of the oxidation occurring during the spray drying operation.

The corn should be extracted only once as subsequent extractions will not remove materials satisfactory for use.

Other cereals may similarly be extracted, using the cereals either in their de-hulled or whole ground form and preparing the concentrated steep-water from the cereals in an analogous manner to that described for corn.

The corn residue, following the removal of the steep-water containing the unfermented water soluble substances, may be utilized for manufacture into ordinary corn whiskey or grain alcohol in the usual manner.

Similarly, in the manufacture of rye whiskey, the rye in dry milled and preferably in finely divided form may be agitated at, for example, 125° F. to 145° F. and preferably at 135° F. for about 1 hour and at a pH of about 4.5 to 6.9 and desirably at 5.5 to 6. Following this extraction period the steep-water may be removed by filtration, concentrated in a vacuum pan to about 25% or more total solids and then added back to the rye whiskey following the fermentation and mashing of the residue and distillation thereof.

In the manufacture of Scotch whiskey, the barley, either before or after sprouting, but desirably before sprouting, may be subjected to an extraction and concentrating process in an analogous manner, and the concentrated steep-water thus obtained added back to the Scotch whiskey following the manufacture thereof.

Where the sprouting of barley is accomplished by adding an excess of water to the barley, such as by adding 2 to 3 parts of water to every 1 part of barley by weight and the water then permitted to drain out and away from the barley until the barley contains only about 50% of water, then permitting the barley to sprout in the normal manner at a relatively low temperature and for a period of several days, the water obtained from the washing process and prior to the sprouting may be concentrated in the manner indicated above and this procedure will make it unnecessary to subject the barley to any further extraction process.

For example, the water removed from the barley in the process of preparing the barley for sprouting and which water has been used for the soaking of the barley and preferably under the pH and temperature conditions outlined above may be concentrated and added back to the whiskey following distillation.

Whiskey made from the grain following the preparation of the steep-water from that grain produces a superior flavored distillate than where the steep-water is not removed and where the whiskey is made from the unextracted cereal. The whiskey is still further improved by reconstituting therein, following the distillation process, of a small amount of the concentrated steep-water obtained prior to the fermentation and mash procedures.

Where desired, however, the washed grain, after removal of the steep-water therefrom may be used in combination with unwashed grain for the fermentation. For example, the corn steep-water may be prepared as indicated above and the washed corn may then be utilized to the extent of from 20% to 70% with ordinary unwashed corn for addition to the fermentation tanks and for manufacture into corn whiskey.

The concentrated steep-water obtained in accordance with this invention differs markedly both in chemical constitution as well as in characteristics from any of the fermentation liquors as well as from any corn steep-water obtained during corn starch manufacture. The concentrated steep-water of this application is substantially free of starch, fibers and oil and is high in water soluble carbohydrates and sugars. At the same time it is substantially free of any fermented, solubilized or converted decomposition or putrefied products of the grain which are present in the mashes and which are produced during the fermentation process.

The concentrated steep-water thus obtained may be added in a small proportion, less 5%, and desirably less than 2%, to the liquors following distillation and manufacture and the resultant liquors are improved in flavor, aroma and keeping quality, do not tend to develop off odors or flavors as readily upon exposure to light, sunshine or air, and in addition may be utilized as beverages without as readily producing intoxicating effects.

The concentrated steep-water may also be added to the whiskey either immediately following distillation or after the usual ageing processes and before final bottling and distribution.

The treated liquors also appear to be reduced in sharpness and acrid flavors as a result of the addition of the concentrated steep-water described.

Although it is particularly desirable for the concentrated steep-water produced from corn to be added to corn whiskey, the steep-water produced from rye added to rye whiskey, etc., the grain steep-water may be interchanged with the various whiskeys produced from grain so that, for example, the concentrated steep-water produced from corn may, where desired, be added to rye whiskey.

Another feature of this invention is that where the grain is degerminated as where corn germ is separated from the corn by dry milling before subjecting the corn to fermentation, a steep-water may be prepared from the finely divided, dry milled corn germ in the manner indicated above for ordinary corn and, where desired, the corn germ residue following extraction thereof may be admixed back with the degerminated corn which may then be allowed to proceed for fermentation and the concentrated corn germ steep-water may be added to the whiskey distillate as indicated above.

In the manufacture of beer, ale or stout, the barley may be extracted in a manner similar to that described for Scotch whiskey to produce the concentrated steep-water; the resultant residue utilized for mashing in the normal manner, and the concentrated steep-water added to the beer, ale or stout in a small amount, preferably immediately before pasteurizing and final bottling.

In the preparation of the steep-water from the grain, modification may be made in the use of the slightly acidified water as when proportions of the water soluble solvents and particularly of alcohol are employed together with water for the steeping process.

For example, there may desirably be employed alcohol, including methyl, ethyl, butyl or propyl alcohol, such as when a mixture of from 30% to 70% of ethyl alcohol is utilized in the water in the steeping of the corn, the alcohol-water mixture being desirably acidified before or during the extraction within the pH range of 4.5 to 6.9. The concentrated steep-water obtained by the use of these modified aqueous liquors has highly desirable characteristics and may be utilized for adding back to the whiskey or other liquor following manufacture thereof.

This application is a continuation in part of application, Serial No. 713,605, filed March 1, 1934, which matured into Patent No. 2,176,032.

Having described my invention, what I claim is:

1. In the process of producing grain whiskey having improved flavor characteristics, the steps of steeping the grain in water having a temperature of between 120° F. and 150° F. at a pH of between 4.5 and 6.9 for about 30 minutes to 3 hours, removing the steepwater from the grain, concentrating said steepwater, producing a mash from the grain residue, fermenting the mash, distilling the mash, and adding a small amount of said concentrated steepwater to the distillate.

2. A whiskey with improved flavor characteristics, formed of a relatively small amount of a concentrated, slightly acidified grain steepwater and a relatively large amount of a distilled whiskey made from said grain after steeping.

3. In the process of producing alcoholic liquors having improved flavor characteristics, the steps of steeping a grain in water having a pH between 4.5 and 6.9, removing the steepwater thus obtained, concentrating said steepwater, producing and fermenting a mash from the grain residue, removing the alcoholic liquor from the mash, and then adding a small amount of said concentrated steepwater to the alcoholic liquor.

4. In the process of producing beer having improved flavor characteristics, the steps of steeping a grain in slightly acidified water, removing the steepwater thus obtained, concentrating said steepwater, producing a mash, removing the beer from the mash, and then adding a small amount of said concentrated steepwater to the beer.

5. In the process of producing corn whiskey having improved flavor characteristics, the steps of steeping the corn at a temperature of about 135° F., at a pH of about 5.5 for about 30 minutes, removing the steepwater from the corn, concentrating said steepwater, producing and fermenting a mash from the corn residue, distilling the mash, and then adding a small amount of said concentrated steepwater to the distillate.

6. An alcoholic liquor having improved flavor characteristics, formed of a relatively small amount of a concentrated, slightly acidified grain steepwater and a relatively large amount of an alcoholic liquor produced by the fermentation of a grain mash after the steeping of said grain to produce said steepwater.

SIDNEY MUSHER.